Patented Jan. 3, 1928.

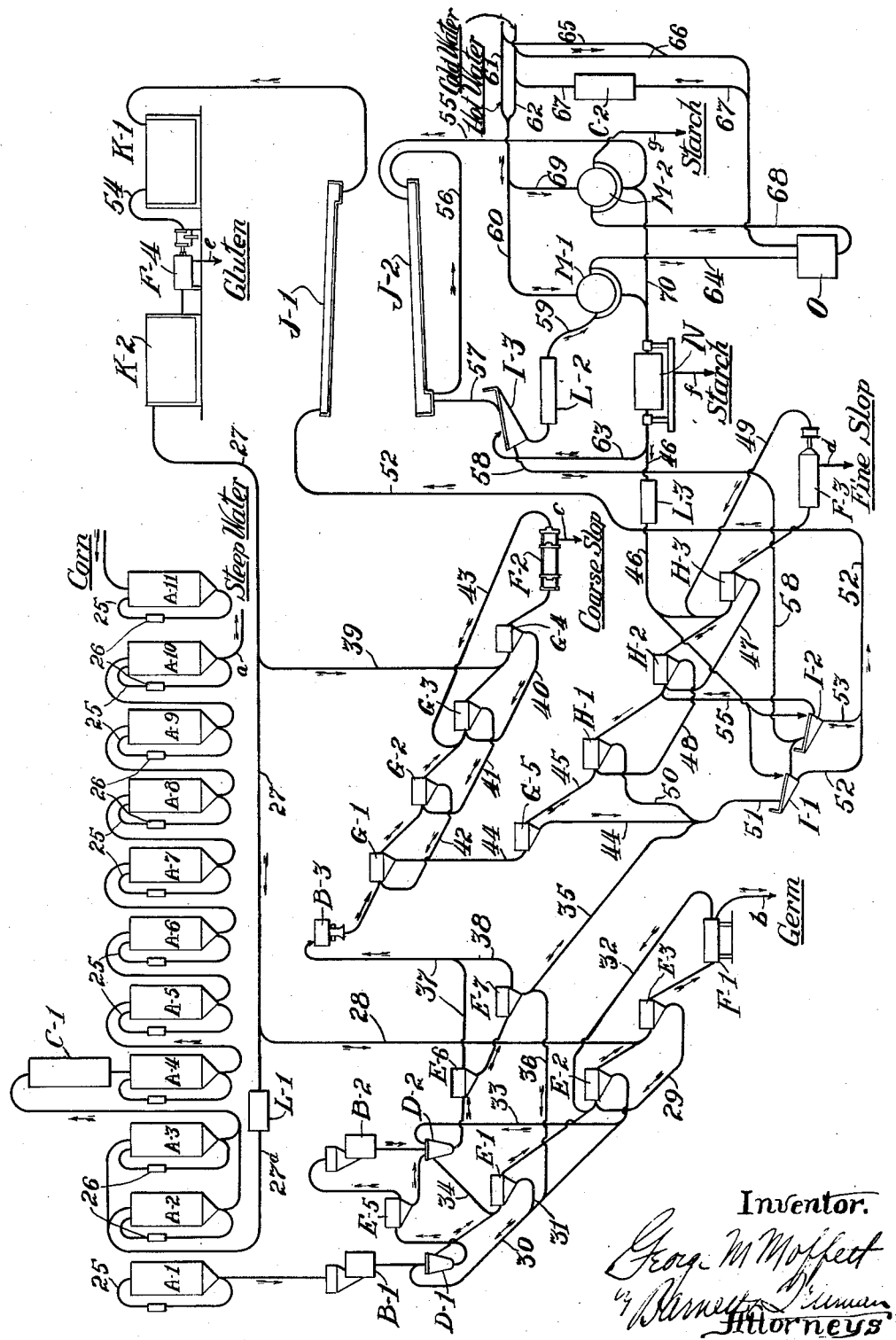

1,655,395

UNITED STATES PATENT OFFICE.

GEORGE M. MOFFETT, OF NEW YORK, N. Y., ASSIGNOR TO INTERNATIONAL PATENTS DEVELOPMENT COMPANY, OF WILMINGTON, DELAWARE, A CORPORATION OF DELAWARE.

MANUFACTURE OF STARCH.

Application filed March 3, 1927. Serial No. 172,333.

My invention relates to the manufacture of starch from corn and its object is to provide in a circular system of starch manufacture, that is a system in which the water is used repeatedly and substantially none discharged to the sewer, certain novel and improved arrangements whereby this return of otherwise waste waters to the system is accomplished in a more convenient, desirable and advantageous manner than heretofore.

It has long been customary in the starch industry to return to the process and reuse the liquids, both starch water and gluten water, derived from the operations by which the starch is separated from the other elements of the grain; this re-use of otherwise waste liquors having been suggested by the obvious desirability of limiting the quantity of water used as far as possible, of preventing stream pollution incident to running waste waters to the sewer, and of effecting as great a saving of the solids contained in the waste waters as is economically feasible in view of the cost of operation. With these advantages in view, starch manufacturers have returned starch and gluten overflow water back to the system in greater or less quantities and have used the same at various different stages in the manufacture of the starch and its by-products. The return of waste waters to the process involves necessarily an increase in content of solubles in the starch as it comes from the tables. However, it has been customary for several years to wash table starch to remove solubles in filters of the American, Oliver and Kelly type, and since that time such filters have come into general use for this purpose there is nothing to prevent the return to the system of all waste waters provided a proper water balance can be worked out. A system providing such water balance is disclosed in the copending application of Rush O. McCoy filed September 14, 1925, Serial No. 56,299. The present process utilizes this feature substantially as in the McCoy case.

It has been proposed recently to sterilize the gluten overflow water before it is returned to the wet starch system, on the theory that such treatment is necessary in order to prevent the gluten waters through fermentation from sliming the reels or sieves used for certain separating operations. This operation is expensive and is entirely unnecessary. The gluten overflow water apparently is not specially liable to fermentation, or at least in present day wet starch systems through which the materials pass in a relatively short time its use does not cause any sliming or other trouble so that it can be repeatedly returned and re-used without sterilization or other treatment of any sort, either by heat or chemicals.

In accordance with the process to be hereinafter described and claimed, the gluten water is re-used in part in the germ system and in part in the system for treating "coarse slop" i. e., the material which is ground up and subjected to separating operations after the germ has been removed from the corn. In the present process a certain amount of sulphur dioxide ($SO_2$) is preferably introduced into the wet starch system (in addition to that coming in with the corn from the steeps) and the liquids used in the wet starch system are preferably heated, to reduce their viscosity for certain of the finer separations. It has long been the custom to maintain a certain $SO_2$ content in the wet starch system, which is varied at the discretion of the foreman as conditions require; and also to keep the wet starch system at a temperature above room temperature by heating inflowing liquids. The present invention provides, however, certain novel arrangements whereby the $SO_2$ and the heat instead of being applied to the whole body of material passing through the system are applied to the materials at certain definite points where the material specially requires heat or acid treatment and this results in economy of operation and more certain control of the process.

The present invention also provides for washing the grain, after it is steeped, with the gluten water to be used for the steeping operation on a subsequent batch of corn, for the purpose of reducing the sulphur dioxide content of the grain going forward to the wet starch system and thereby preventing the sulphur dioxide from building up in the wet starch system; or, to put the matter the other way, for the purpose of retaining in the steeping system as much as possible of the sulphur dioxide used in the steeping operation.

The accompanying drawing is a flow sheet diagram illustrating the application of the present improvements to practice. The process will be best understood by keeping in mind that there are six operations involved, each of which has its proper apparatus, namely: (1) steeping the corn; (2) breaking up the kernels, separating the germs by flotation and washing the germs to free the same of starch; (3) grinding the residue from the germ separation, to wit, the starch, gluten and hull and subjecting this "coarse slop" to reeling or sieving operations; (4) subjecting the "fine slop", that is the material passing through the "coarse slop" reels or sieves, to reeling or sieving operations to separate the starch and gluten from the bran; (5) tabling the starch and gluten to separate the gluten from the starch; and (6) flushing or otherwise removing the starch from the starch tables, dewatering the diluted starch and washing it in filter presses to remove solubles.

The process as above outlined has been in use for a long time. It has been customary to withdraw the steep water and its solubles from the steeping system concentrate it and mix it with the bran and germ hull and gluten to form cattle feed, and in some cases a part of the water separated from the gluten has been returned to the steeps for the purpose of increasing the concentration of solubles therein.

The water introduced into the system for steeping, for the germ and coarse and fine slop separations, for flushing or diluting the table starch and for washing the starch finds outlet from the system as follows: from the steeps as light steep water sent to the evaporators; with the germs sent to the germ drier; with the bran or tailings from the coarse slop going to the feed drier; with the bran or tailings from the fine slop going to the feed drier; and with the starch sent to the converters or starch driers. This, however, does not account for the water overflowing from the gluten settlers or the filtrate extracted from the starch or the fresh water introduced into the starch filters. In a complete circular system these liquids are returned to the system and used in place of fresh water.

The process of the present invention will now be described in detail, reference being made to the accompanying drawing.

*Steeping.*—A battery of eleven steep tanks $A^1$ to $A^{11}$ is preferably employed. The arrangement provides connections (not completely illustrated) whereby the fresh steep liquor is brought into contact with the oldest batch of grain and then passed through the steep tanks successively in the direction toward the tank containing the freshest grain. Each steep has its separate circulating pipe 25 containing a heater 26. As shown seven steep tanks $A^4$ to $A^{10}$ inclusive, are in operation at one time. The steeping in steep $A^1$ has been completed and the unit has been cut out and the corn is being withdrawn from it to mill $B^1$. Steeps $A^2$ and $A^3$ are being washed with unsulphurized gluten settler overflow water from pipe 27 to reduce $SO_2$. This water goes into steep $A^4$ after passing through the sulphur towers $C^1$. The steep water is being drawn from steep $A^{10}$ and this liquid sent to the vacuum pans for evaporation (outlet $a$). Steep $A^{11}$ is being filled with fresh corn. At the next cycle the corn will be ground from steep $A^2$; steeps $A^3$ and $A^4$ will be washed and steep $A^3$ drained; steep $A^5$ will be first to receive steep water from the sulphur tower $C^1$; and steep $A^{11}$ will be cut into the system after steep $A^{10}$ and its effluent discharged to the evaporator.

*Germ separator.*—The steeped corn is broken up in mill $B^1$ and the germ freed. The material then goes into separator $D^1$, in which the germs are separated from the grits and hull by flotation. The germs floating off are passed successively through germ reels $E^1$, $E^2$, $E^3$ and are then pressed for extraction of water in press $F^1$, the germs going out of the system at this point (outlet $b$). Gluten overflow water is introduced into reel $E^3$ by pipe 28 from pipe 27, and passes by pipe 29 to reel $E^2$ and by pipe 30 to separator $D^1$. Liquid from reel $E^1$ goes to the separator $D^1$ by pipe 31. Liquid from press $F^1$ is returned by pipe 32 to reel $E^2$. The material (starch grits, gluten and bran) which settles in separator $D^1$ is passed through draining reel $E^5$, to mill $B^2$ and then to separator $D^2$ to which liquid passes from reel $E^5$ and from reel $E^2$ through pipe 33. The germs floated off in the second separator pass through pipe 34 to the germ reel $E^1$. The degerminated material in separator $D^2$ passes through the coarse reel $E^6$ and fine reel $E^7$. The starch liquor from reel $E^7$ passes through the starch pipe 35 to the tables, as will be described, a part, if necessary being diverted to the germ system through pipe 36 to maintain proper density in the separators.

*Coarse slop.*—The tailings from reels $E^6$, $E^7$, starch, gluten and bran, pass through pipes 37, 38 to buhr mill $B^3$ where they are ground and passed successively through coarse slop reels $G^1$, $G^2$, $G^3$, $G^4$ to the press $F^2$. From press $F^2$ the bran goes out of the system carrying a certain amount of moisture (outlet $c$). Gluten overflow water from pipe 27 passes through pipe 39 to reel $G^4$ and by pipes 40, 41, 42 to reels $G^3$, $G^2$ and $G^1$. Water from press $F^2$ goes back to reel $G^3$ by pipe 43. Starch liquor from reel $G^1$ passes through pipe 44 and through draining reel $G^5$ to tables.

*Fine slop.*—The tailings from draining reel $G^5$ pass by pipe 45 to the first of a series of fine slop reels H¹, H², H³ and to a press F³ from which the bran goes out of the system carrying with it some moisture (outlet $d$). Reel H³ is supplied with liquid from the starch filters by pipe 46 and passes by pipes 47 and 48 to the reels H² and H¹. Liquid from press F³ goes back to reel H³ by pipe 49. Starch liquid from reel H¹ goes by pipe 50 to the tables.

*Tabling.*—The starch milk streams, (starch, gluten water and solubles) in pipes 35, 44, 50 unite and are run by pipe 51 through clean-up shakers I¹, I² and pipes 52, 53 to starch table J¹ on which the starch subsides and from which the gluten and water tails off and is collected in gluten settler K¹. For convenience two gluten settlers are shown, one settler K¹—filling—and the other settler K²—discharging. The gluten subsiding in settler K² is pressed in press F⁴ and goes out of the system carrying with it some moisture (outlet $e$). The water from the press goes back to the settler K¹ by pipe 54. The tailings from shaker I² go by pipe 55 to reel H². The overflow from settler K² is by pipe 27 which supplies with liquid the steeps, the germ system and the coarse slop system, as described. The portion 27ª of pipe 27 leading to the steeps contains a heater L¹ for heating the steep liquid to the usual steeping temperature 130° to 140° F. The gluten overflow water going through pipes 28 and 39 to the germ and coarse slop systems is not heated or otherwise treated in any manner.

*Flushing.*—A second table J² is shown being flushed. It receives water from the starch filtering operation by pipe 55 which is circulated continuously over the table by means of circulating pipe 56 until the proper density is obtained and is then discharged through pipe 57 and clean-up shaker I³ to the starch filters to be described, the tailings from I³ going by pipe 58 to clean-up shaker I².

*Washing or filtering.*—The starch flushed from table J² and passing through clean-up shaker I³ goes to starch filter M¹ (preferably an American filter although other types might be used), through a heater L² and pipe 59. This filter first dewaters the starch leaving it in a relatively thin stratum, the dilution through flushing and later dewatering removing some of the solubles. Additional solubles are removed by forcing fresh water through the dewatered starch stratum. This water is brought to the filter by a pipe 60 connected with a hot water supply pipe 61 and a cold water supply pipe 62. The filtrate, which will carry some starch particles, is filtered in a filter press N (Sweetland type preferred), the filtrate from which passes by pipe 46 to the fine slop system, and if desired in part by pipe 63 to the clean-up shaker I³. The water going to the fine slop system is preferably heated to about 125° F. in a heater L³. The starch collected in filter press N (Sweetland) is discharged from the system carrying with it a certain percentage of moisture (outlet $f$). The starch from filter M¹ (first American) goes by pipe 64 to a diluting vessel O where it is diluted with water taken from hot and cold water supply pipes 61, 62 through branch pipes 65, 66, with which may be mixed sulphur dioxide solution made by passing water by pipe 67 through the sulphur tower C². The starch diluted in O is then dewatered and washed in filter M² (second American), the operations being the same as in filter M¹. Starch milk enters M² by pipe 68 and fresh water by pipe 69. It is the filtrate from this filter, the second of the pair, which is used, through pipe 55 for flushing or diluting the starch on the tables, the arrangement having the advantage that through use of water from the second filter the amount of additional solubles incorporated with the table starch is minimized since the first filtering will remove most of the soluble substances from the starch. Any surplus filtrate from filter M² may be sent to filter press N through pipe 70.

The starch taken from filter M² is the finished product ready for conversion to glucose, grape sugar or for drying and marketing as starch. In going out of the system it will carry a certain amount of moisture (outlet $g$).

It will be understood that in practice batteries of reels, shakers, mills, tables, etc. will be used in the ordinary installation where, in the drawing herein, only one such element is shown. Shakers may be used for reels and reels for shakers and in fact, the process is not limited to the particular apparatus shown. In filtering any type of filter or filter press may be used which operates on the principle of dewatering the starch and then removing the remaining solubles by displacement. In practice liquids will be withdrawn from the apparatus for washing of floors, tables, etc. but the liquid so withdrawn will be returned so as not to disturb the water balance.

In summarizing it may be said that: Water finds outlets for the system at the following places: ($a$) light steep water; ($b$) germ; ($c$) coarse slop bran; ($d$) fine slop bran; ($e$) gluten; ($f$) and ($g$) starch.

The gluten overflow water is used in the germ and coarse slop separations only. It is not treated either by heat or chemicals. The reels used in these separations are mostly rather coarse reels.

The filtrate for the starch filters is used (1) for flushing the starch from the tables and (2) for the fine slop separation. It is heated immediately in advance of contact with the silk reels of the fine slop system. The heating is for the customary purpose of reducing viscosity.

The $SO_2$ concentrations may be adjusted, as has always been the practice, at the discretion of the foreman and to meet varying conditions in the process, one purpose of the $SO_2$ being supposed to be to increase the solvent effect of the water on certain non-starch constituents of the corn. It has also been the belief that $SO_2$ checks the tendency to putrefactive fermentation where such tendency exists. This preventive effect of $SO_2$ in respect to bacterial action is probably much greater than its sterilizing effect, that is than its destructive effect on existing organisms which is apparently small. A certain amount of $SO_2$ enters the wet starch system with the steeped corn. This can be varied by controlling the washing of the corn as illustrated in connection with steeps $A^2$, $A^3$. $SO_2$ may also be introduced into the fresh water used for supplying the starch filters. These are the only two points at which $SO_2$ is introduced, and it seems desirable in view of the preventive effect of $SO_2$ that it be introduced into the system at a few places and in relatively large volumes rather than in small quantities at a larger number of points. Generally speaking the $SO_2$ concentrations need be no higher than was customary when fresh water was used to a large extent in the germ and slop separations. This result is made possible by the washing of the steeped corn with gluten overflow water before the gluten water is passed through the sulphur tower. A certain amount of sulphur dioxide enters the wet starch system with the corn. The balance of the sulphur dioxide enters the wet starch system from the starch filtering operations. By proper control of the sulphur dioxide introduced into the system at opposite ends, the sulphur dioxide content may be maintained substantially uniform throughout the system and at the proper degree, without, that is, the building up which would be likely to occur if the corn from the steeps, where the concentration is high, were allowed to pass into the wet starch system with its full sulphur dioxide content.

I claim:

1. In the process of manufacturing starch comprising steeping and disintegrating the corn, separating the germ, separating the bran and fibre in coarse and fine slop separations, tabling the starch to remove therefrom water and gluten, and filtering the starch with fresh water to remove solubles: the improvement which consists in reusing the water from the starch tables in part for steeping and in part for the germ and coarse slop separations, and reusing water from the starch filters for the fine slop separation.

2. The improved process of claim 1 which comprises introducing sulphur dioxide into the process only at the steeps and with the fresh water used in the filtering operation.

3. The improved process of claim 1 which comprises heating the starch filter filtrate before it is introduced into the fine slop system.

4. The improved process of claim 1 which comprises heating the flushed starch before it is filtered.

5. The improved process of claim 1 which comprises giving the tabled starch two successive filtering operations, using the filtrate from the second filtering operation for flushing the starch from the tables and filtering the filtrate from said first filtering operation and reusing same for the fine slop separation.

6. The improved process of claim 1 which comprises giving the tabled starch two successive filtering operations, using the filtrate from the second filtering operation for flushing the starch from the tables, and filtering the filtrate from said first filtering operation and heating and reusing same for the fine slop separation.

7. The process of claim 1 in which the gluten overflow water returned to the germ and coarse slop separation is divided into two separate streams, one of which is passed through the germ separating devices and then to the starch tables and the other through the coarse slop separating devices and to the starch tables.

8. The process of claim 1 which comprises giving the table starch two successive filtering operations and using the filtrate from the second filtering operation in part for flushing the starch from the tables and in part for the fine slop separation.

9. In a cyclic process of manufacturing starch comprising steeping the corn with water and an acid, distintegrating the steeped corn, separating in water the starch from the other constituents of the corn and reusing the water derived from such separating operation for steeping and for separating starch from subsequently treated corn: the improvement which consists in washing each batch of steeped corn with water derived from a precedent separating operation to reduce the acid content of the corn before it is disintegrated.

10. The process of claim 9 in which the starch is filtered and washed with fresh water to remove solubles and the wash water utilized in subsequent separating operations, and in which additional acid is introduced into the system at the starch filtering stage of the process.

11. In a cyclic process of manufacturing starch which comprises steeping the corn in water and an acid, distintegrating the steeped corn, separating in water the starch from the germ, bran and gluten, filtering and washing the starch with fresh water to remove solubles, and reusing the water derived from the separating and starch filtering operations in the steeping and separation of subsequently treated material: the improvement which consists in introducing additional acid into the fresh water used in the starch filtering operation.

12. In a cyclic process of manufacturing starch which comprises steeping and disintegrating the corn, separating in water the starch from the germ, bran and gluten, filtering and washing the starch with fresh water, and reusing the water derived from the separating and filtering operations for the steeping and separation of subsequently treated material: the improvement which consists in heating the starch liquor before filtration and reheating the filtrate before it is reused in the separating operation.

GEORGE M. MOFFETT.